United States Patent
Li et al.

(10) Patent No.: US 8,653,385 B2
(45) Date of Patent: Feb. 18, 2014

(54) TROLLEY CASE WITH WEIGHT MONITORING LEG ADAPTED TO SUPPORT THE CASE WHEN MOVED INTO WEIGHING POSITION

(75) Inventors: Xinxin Li, Yiwu (CN); Yangling Wu, Shanghai (CN)

(73) Assignee: Shanghai Zhijing Biological Technology Co., Ltd., Shanghai (CN)

( * ) Notice: Subject to any disclaimer, the term of this patent is extended or adjusted under 35 U.S.C. 154(b) by 340 days.

(21) Appl. No.: 13/048,874

(22) Filed: Mar. 16, 2011

(65) Prior Publication Data

US 2011/0226534 A1 Sep. 22, 2011

(30) Foreign Application Priority Data

Mar. 16, 2010 (CN) .......................... 2010 2 0131843

(51) Int. Cl.
 *G01G 19/52* (2006.01)
 *G01G 19/58* (2006.01)

(52) U.S. Cl.
 USPC .......................................... 177/245; 190/100

(58) Field of Classification Search
 USPC ............................ 177/131, 148, 245; 190/100
 See application file for complete search history.

(56) References Cited

U.S. PATENT DOCUMENTS

| | | | | | |
|---|---|---|---|---|---|
| 7,084,357 | B2 * | 8/2006 | Roberts et al. | ................ | 177/131 |
| 7,265,302 | B2 * | 9/2007 | Keech et al. | ................ | 177/131 |
| 7,439,456 | B2 * | 10/2008 | Ogunnaike | ................ | 177/148 |
| 7,692,107 | B1 * | 4/2010 | Shotey et al. | ................ | 177/131 |
| 2005/0217903 | A1 * | 10/2005 | Roberts et al. | ................ | 177/245 |
| 2005/0217904 | A1 * | 10/2005 | Hughes | ................ | 177/245 |
| 2006/0266563 | A1 * | 11/2006 | Kaplan | ................ | 177/245 |
| 2007/0205025 | A1 * | 9/2007 | Taha | ................ | 177/245 |
| 2007/0272449 | A1 * | 11/2007 | Ogunnaike | ................ | 177/25.18 |

* cited by examiner

*Primary Examiner* — Randy W Gibson (57) ABSTRACT

A trolley case including a case body and a weight monitoring device. The weight monitoring device is mounted on the case body, including a pressure sensor, a transmission unit, and a display module. The pressure sensor is mounted on the case body, and supports the case body when using. When being applied by a pressure, the pressure sensor transmits the pressure to a corresponding electrical signal according to an intension of the pressure. The intension of the electrical signal is corresponding to the intension of the pressure. The transmission unit is electrically connected to the pressure sensor, and transmits the electrical signal into a corresponding weight value. The display module is electrically connected to the transmission unit for display the weight value.

20 Claims, 7 Drawing Sheets

TROLLEY CASE WITH WEIGHT MONITORING LEG ADAPTED TO SUPPORT THE CASE WHEN MOVED INTO WEIGHING POSITION

BACKGROUND OF THE PRESENT INVENTION

1. Field of Invention

The present invention relates to a trolley case, and more particularly to a trolley case which is capable of monitoring its weight, so as to arrange carried articles, especially in circumstances of weight restrictions.

2. Description of Related Arts

A trolley case has been necessary when people have a trip. It has stable structure to protect the articles inside from external pressing and facilitate utilizing space in delivery, therefore is convenient to carry. Besides, the trolleys have handles and wheels, and can be drawn easily.

In some circumstances, such as in boat or plane where the luggages are consigned, the size and weight of luggages is restricted. The size restriction can be meet easily, because the size of trolley is labelled clearly when buying, and people can judge the size by life experience. However, the weight is often a problem. The trolley on sale is empty, and contains different articles each time, so that its weight can not be controlled so easily. If the weight exceeds the restriction, high extra fees are charged ordinarily or even unallowable to carry. On the other hand, to avoid the restriction, the carried articles may not be enough in trip.

A solution is to buy a scale home when preparing the luggage, but it seems to be unnecessary. For some families having bathroom scales, the bathroom scales are too small and is not suitable for weighing the trolley. For example, the trolley can not stand stably on the bathroom scales, and need to be held by hand, and the trolley is too heavy to be lifted onto the bathroom scales.

SUMMARY OF THE PRESENT INVENTION

An object of the present invention is to provide a trolley case which is capable of monitoring self weight, so that people can arrange articles to be carried conveniently.

Another object of the present invention is to provide a trolley case suitable for circumstances having limitation for luggage weight, such as buses, ships, and planes. The trolley can monitors its self weight, and therefore troubles caused by weight exceeding will be avoided.

Another object of the present invention is to provide a trolley case which is capable of monitoring its self weight, wherein the producing process is simple and low cost, and therefore applicable for industrial manufacture.

Another object of the present invention is to provide a trolley case which is capable of monitoring its self weight, wherein only simple operation is necessary to read its weight.

Another object of the present invention is to provide a trolley case which is capable of monitoring its self weight, is reliable and has long service life.

Another object of the present invention is to provide a trolley case which is capable of monitoring its self weight, wherein as comparing to conventional trolley cases, the present invention does not increase the weight thereof obviously, so that the articles to be carried will not be decrease, and therefore the trolley case is convenient to use.

Accordingly, in order to accomplish the above objects, the present invention provides a trolley case, comprising:

a case body; and a weight monitoring device, comprising: a pressure sensor mounted on the case body for supporting the trolley case when using, which reacts to an intension of a pressure when being applied by the pressure and outputs a corresponding electrical signal, a transmission unit electrically connected to the pressure sensor, which transmits the electrical signal to a corresponding weight value after receiving the electrical signal, and a display module electrically connected to the transmission unit for display the weight value.

These and other objectives, features, and advantages of the present invention will become apparent from the following detailed description, the accompanying drawings, and the appended claims.

DETAILED DESCRIPTION OF THE PREFERRED EMBODIMENT

Referring to FIG. 1-7 of the drawings, a trolley case according to a preferred embodiment of the present invention is illustrated, comprising a case body 1 and a weight monitoring device 2.

Figure 1:
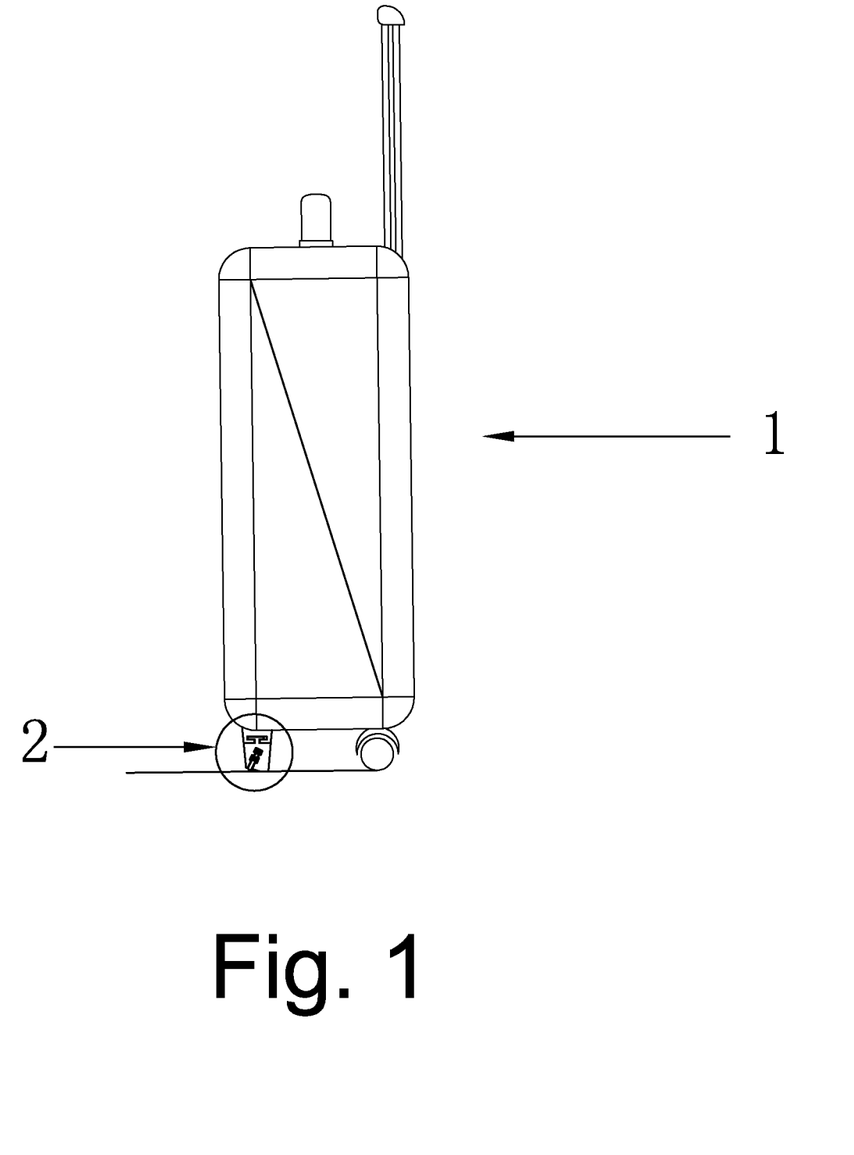
FIG. 1 is a perspective view of a trolley case according to a first preferred embodiment of the present invention.
Figure 2:
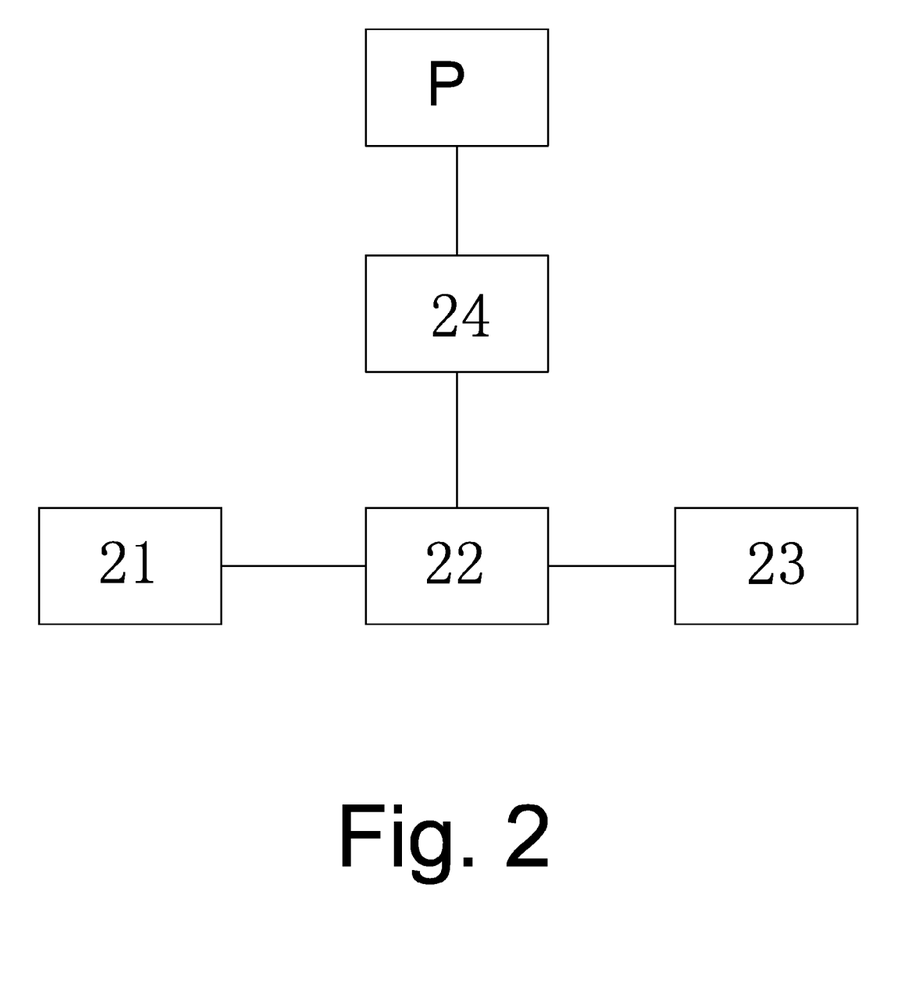
FIG. 2 is a schematic view of a weight monitoring device of the trolley case according to the first preferred embodiment of the present invention.

The weight monitoring device 2 is mounted on the case body 1, comprising a pressure sensor 21, a transmission unit 22, and a display module 23. The pressure sensor 21 is mounted on the case body 1, and supports the case body 1 when using. When being applied by a pressure, the pressure sensor 21 transmits the pressure to a corresponding electrical signal according to an intension of the pressure. The intension of the electrical signal is corresponding to the intension of the pressure. The transmission unit 22 is electrically connected to the pressure sensor 21, and transmits the electrical signal into a corresponding weight value. The display module 23 is electrically connected to the transmission unit 22 for display the weight value.

With the foregoing structure, the trolley case is capable of monitoring a self weight thereof, so that people can conveniently know a weight of the trolley case when preparing luggage, and can accordingly adjust numbers and species of articles to be carried, so as to facilitate trip as possible.

The case body 1 can be embodied as conventional trolley cases, comprising but not limited to cubical, and can have lifting handle, pulling stick and wheels.

According to a preferred embodiment of the present invention, the pressure sensor 21 protrudes on a rear side of the case body 1, and has a supporting surface 20 providing an efficient supporting area 20 to the case body 1 when using. The display module 23 is mounted on a front side of the case body 1. When using, by standing the case body 1 on the rear side thereof, and then leaning the case body 1 to support the trolley case by the supporting area 20, the weight of the trolley case is measured. Since only simple operation is needed to read the weight of the trolley case, the use is convenient. Additionally, since a weight precision is not needed to be very high, the supporting surface 20 can be decreased appropriately. Therefore, when measuring the weight of the trolley case, the trolley case can be held by hand from aside to provide a supplemental support, so as to simplify a structure and cost thereof.

Figure 4:
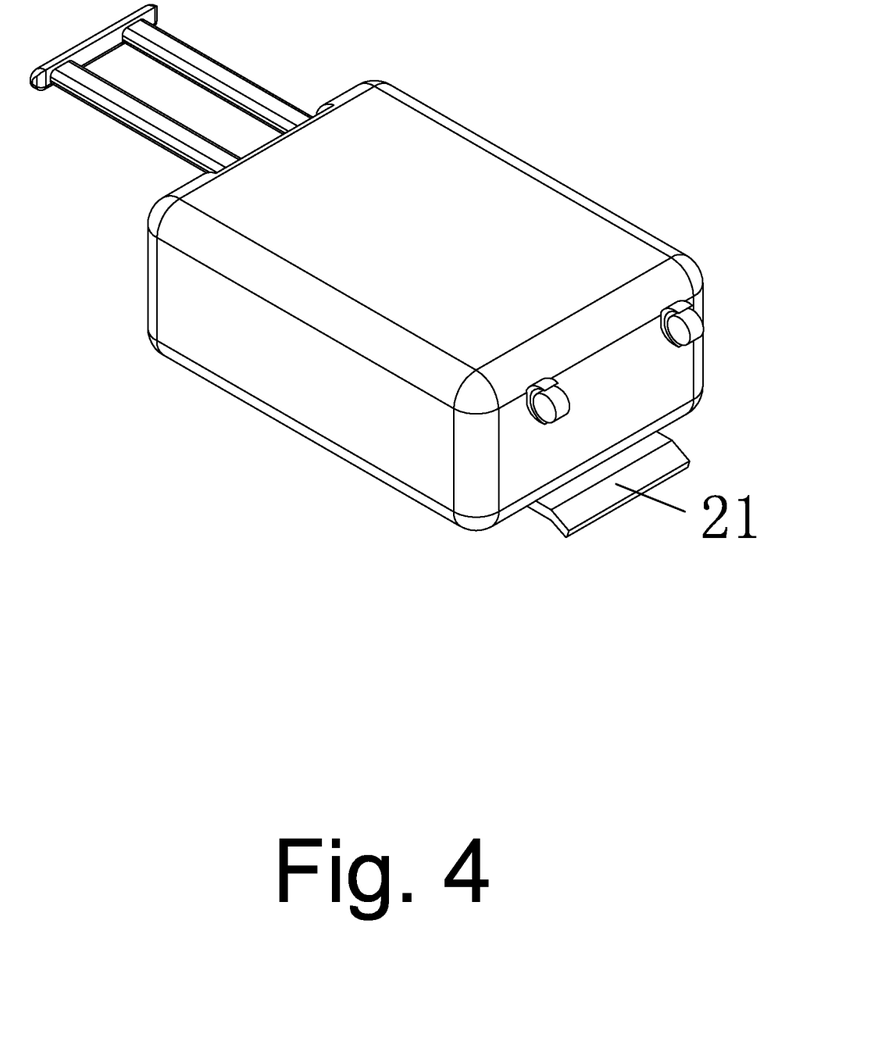
FIG. 4 is a perspective view of a pressure sensor according to a first preferred embodiment of the present invention.

According to a first preferred embodiment of the present invention, the pressure sensor 21 is embodied as single-point supporting, which is a rod structure having a first end mounted on the case body 1, and a second end protruding from the case body 1. When using, the second end supports the pressure sensor 21, and the pressure sensor 21 reacts to a shape change thereof and outputs a corresponding electrical signal. To persons skilled in the art, it is obvious that the pressure sensor 21 can be mounted on an upper portion of the case body 1, and the weight of the trolley case is measured by suspending the trolley case. The suspending operation is not so convenient, but should also be included in the present invention.

Figure 5:
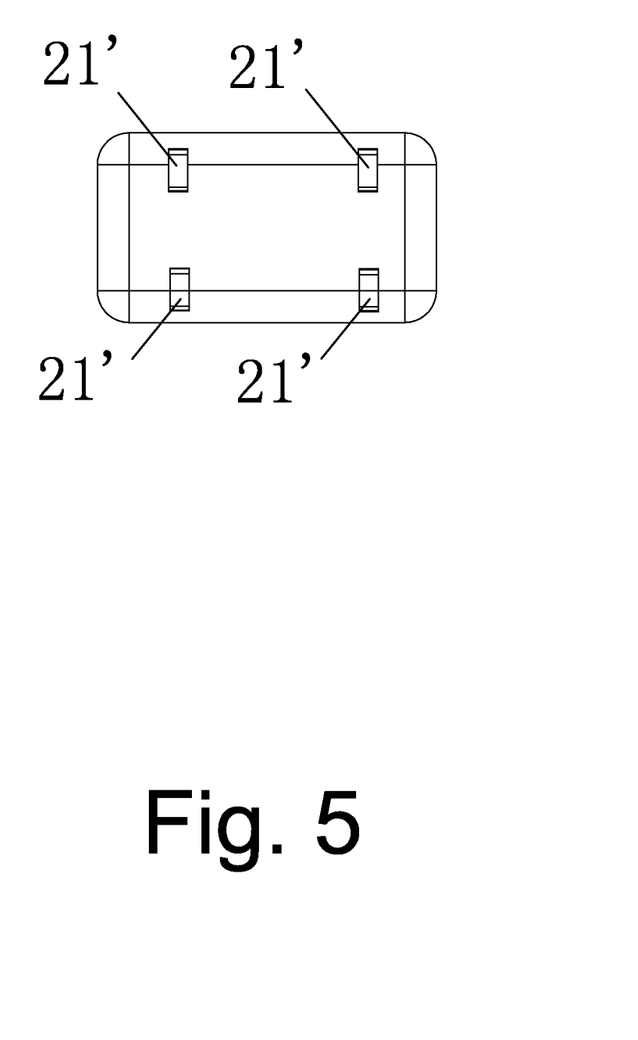
FIG. 5 is a perspective view of the pressure sensor according to a second preferred embodiment of the present invention.

According to a second preferred embodiment of the present invention, the pressure sensor 21' is multiple-point supporting, which has four pressure points provided on the case body 1 and defining a supporting surface 20, so as to realize self-balance of the trolley case, which does not obviously increase the weight of the trolley case.

According to a preferred embodiment of the present invention, the weight monitoring device 2 further comprises an automatic power-off module 24 for cutting a power supply of the weight monitoring device 2 after the pressure sensor 21 is idle for a substantially long time, so as to save energy, reduce cost and extend a service life the trolley case. Preferably, the weight monitoring device 2 is powered by batteries, so as to facilitate carrying and using.

According to another preferred embodiment of the present invention, the weight monitoring device 2 further comprises a switch. The pressure sensor 21 is mounted on a bottom of the case body 1 to support. The switch is off to save energy when idle, and is on to monitor the weight of the trolley case when needing, so as to monitor a weight change of the trolley case real-time.

Figure 3:
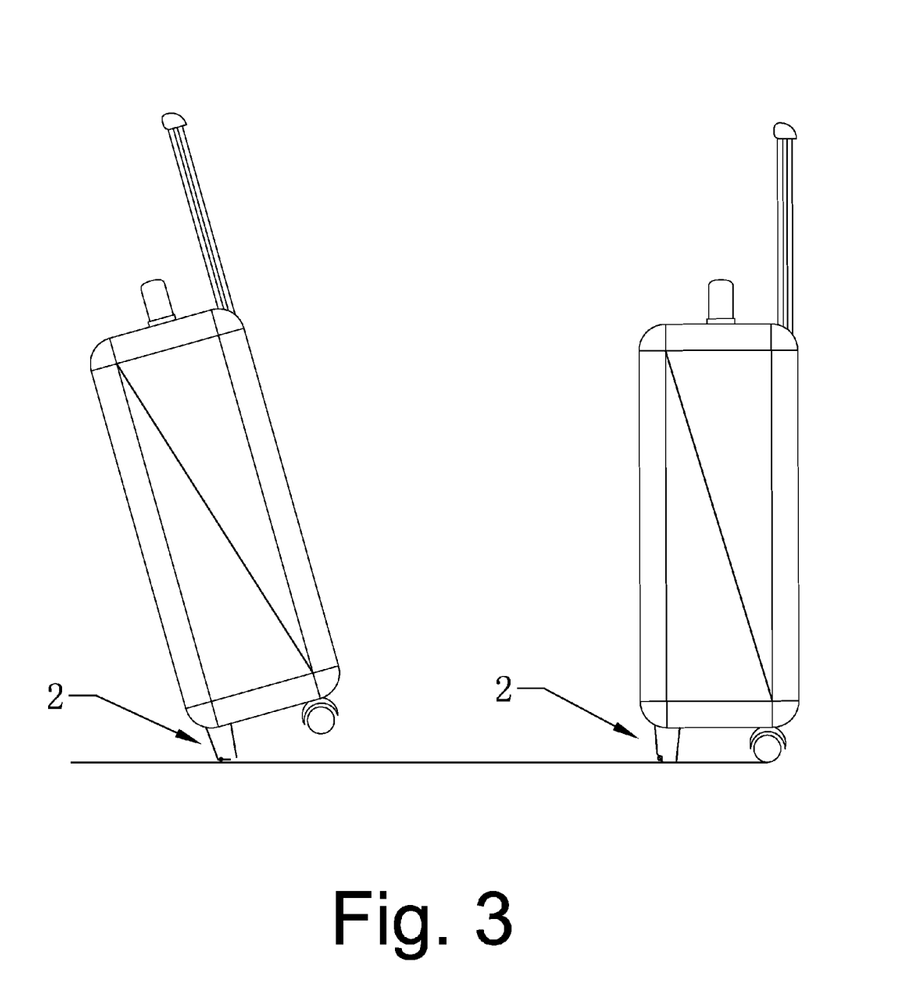
FIG. 3 is a schematic view of the trolley case according to a first preferred embodiment of the present invention illustrating an idle manner and a working manner.

Particularly, the weight monitoring device 2 further comprises a switching structure 25. The pressure sensor 21 is connected with the bottom of the case body 1 via the switching structure 25. The switching structure 25 can be embodied as a hinge joint or an element sliding back and forward that people skilled in the art would easily think about. The pressure sensor 21 does not support the trolley case when idle, and by enabling the switching structure 25, the pressure sensor 21 protrudes outsides the case body 1 to support temporarily for monitoring the weight of the trolley case real-time when using. According to another preferred embodiment of the present invention, the switching structure is detachable, so as to detach the pressure sensor 21 from the case body 1 when idle, and assemble to the case body 1 when using.

Figure 6:
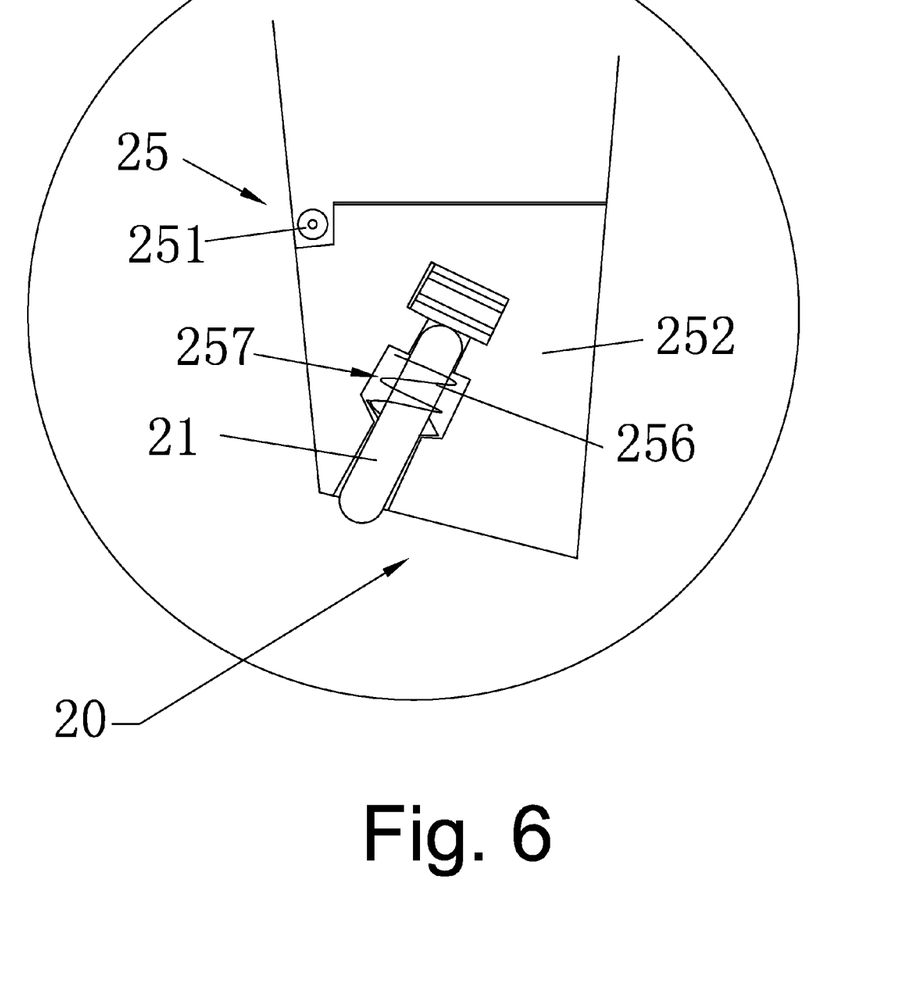
FIG. 6 is a perspective view of a switch structure according to a first preferred embodiment of the present invention, illustrating enlarged portion in FIG. 1.

Particularly, the switching structure 25 comprises a hinge 251, and a leg 252. The leg 252 is rotatably connected to the case body 1 via the hinge 251. The leg 252 has a receiving hole 257 vertical to the supporting surface 20 which is leaning with respect to the ground and fully attaching the ground when supporting the trolley case, so that the receiving hole 257 is vertical to the ground when weighing. The pressure sensor 21 is received inside the receiving hole 257, and protruding slightly outside the supporting surface 20, so as to weigh the trolley case when the supporting surface 20 supports the trolley case.

Preferably, the switch structure 25 further comprises a spring 256 mounted inside the receiving hole 257 for supporting the pressure sensor 21, so as to prevent the pressure sensor 21 wholly hidden inside the receiving hole 257.

Figure 7:
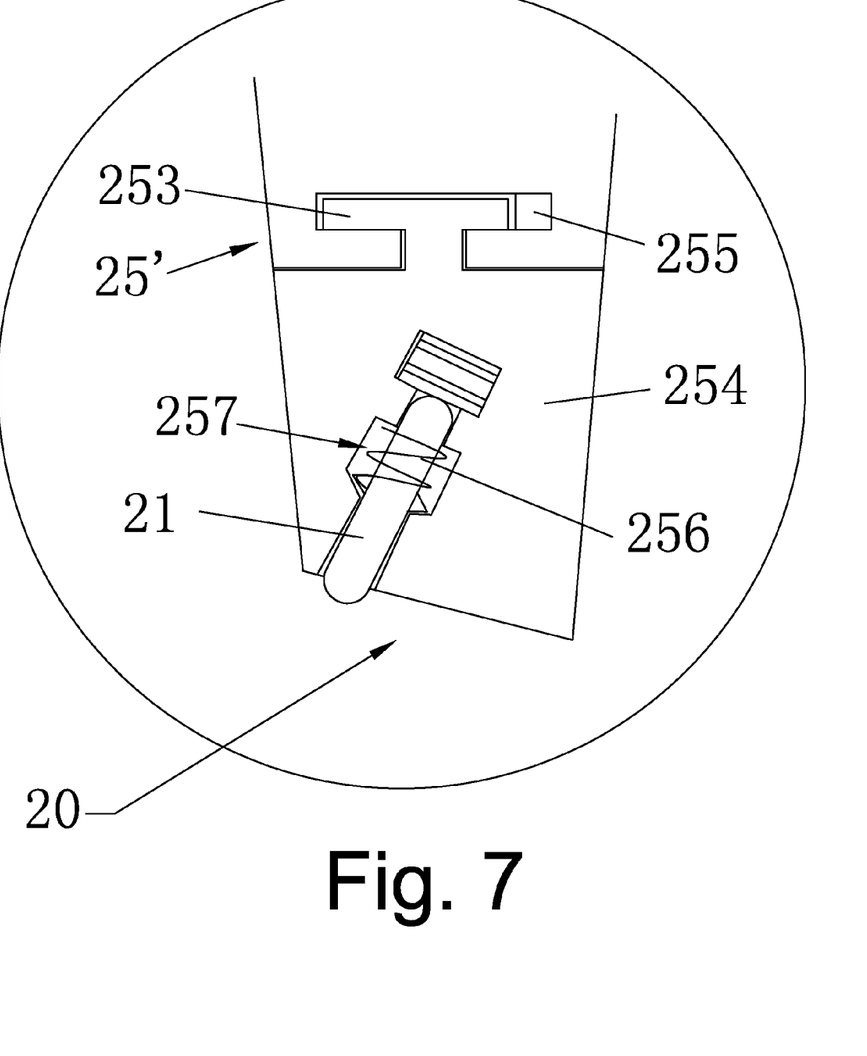
FIG. 7 is a perspective view of the switch structure according to a second preferred embodiment of the present invention, illustrating enlarged portion in FIG. 1.

Particularly, the switching structure 25' comprises a mounting groove 255 on the bottom of the case body 1, and a leg 254 having a corresponding block 253 on a top thereof for engaging with the mounting groove 255. The leg 254 has a receiving hole 257 vertical to the supporting surface 20 which is leaning with respect to the ground and fully attaching the ground when supporting the trolley case, so that the receiving hole 257 is vertical to the ground when weighing. The pressure sensor 21 is received inside the receiving hole 257, and protruding slightly outside the supporting surface 20, so as to weigh the trolley case when the supporting surface 20 supports the trolley case.

Further, the leg 254 is detachable from the case body 1. Therefore, the trolley case can be used as a common trolley case when weight monitoring is not needed, so as to avoid damaging or ageing of the pressure sensor 21, and the detachable leg is convenient to carry, and can be used by simply assembly.

The pressure sensor 21 can be embodied as resistance strain gauge pressure sensor, semiconductor gauge pressure sensor, piezoresistive pressure transducer, inductive pressure sensor, capacitive pressure sensor, resonant pressure sensor and capacitive accelerometer. According to the present invention, piezoresistive pressure transducers are preferred, which has very low price, high precision, and good linear performance, so that the weight monitoring device 2 has simple structure, light weight, reliable performance, and low cost, and therefore does not increase the weight of the trolley case or cost.

Piezoresistive pressure transducers mainly consist of resistance strain gauges according to Wheatstone bridge principle. Resistance strain gauge is a sensitive device converting change of the device under test into an electrical signal, and is a major component of piezoresistive strain sensor. Resistance strain gauge is mostly used in metal resistance strain gauge and semiconductor strain gauges. Metal strain gauges have filamentous-like strain gauges and metal foil strain gauges. Strain gage is usually attached to a mechanical strain matrix by a special binder, wherein the matrix deforms under a stress, the resistance strain gauges also change with the deformation, so that the resistance thereof changes, so that the voltage on the resistance changes. When the strain gauges is under stress, the resistance changes are usually small, so that the strain gauges are used to form strain gauge bridge, and through following instrumentation amplifier to amplify, and then being transmitted to the processing circuit (usually the A/D conversion and CPU) display or executing agencies.

Metal resistance strain gauge consists of base material, metal foil strain or strain wire, insulation sheet and terminations, and other components. According to different purposes, resistance of the resistance strain gauges can be designed by the designer, but the range of resistance should be noted that if the resistance is too small, the required drive current is too large, while the own temperature of the resistance is too high, and in different environments, resistance of the strain gauges changes too much and output zero drift is obvious, the zero circuit is too complicated. If the resistance is too large, the impedance is too high, and the capability of electromagnetic interference from outside is weak. Therefore, the resistance is dozens to a few thousand Ω.

Corrosion-resistant ceramic pressure sensor has no transmission of fluid, and the pressure is directly applied on the front surface of the ceramic diaphragm, the diaphragm will produce small deformation. Thick film resistors are printed on the back of the ceramic diaphragm, and connected into a Wheatstone bridge (closed bridge). Due to the piezoresistive effect of piezoresistor, the bridge produces a voltage signal proportional to the pressure which is highly linear, an the excitation voltage is also proportional to the voltage signal. The standard pressure range according to the different signal calibration is 2.0/3.0/3.3 mV/V, etc., and can be compatible to the strain sensors. By laser calibration, the sensor has high temperature stability and time stability, and temperature compensation of 0~70° C., and can direct contact with most media.

Ceramic is a recognized high elasticity, corrosion resistance, abrasion resistance, shock and vibration material. The thermal stability of ceramic and the thick film resistor thereof make the operating temperature range up to −40~135° C., and has high precision and high stability for measuring. Electrical insulation level>2 kV, the output signal is strong, and long-term stability is good. The ceramic sensors of high properties, and low price will be the development direction of the pressure sensor, in Europe and the United States has a trend comprehensive alternative to other types of sensors, and in China also has a growing number of users replacing silicon pressure sensor with spread of ceramic sensor.

The working principle of diffusion of silicon type pressure sensor is that: the pressure of measured media directly applies on the sensor diaphragm (stainless steel or ceramic), produces a micro-displacement on diaphragm proportional to medium pressure, makes the sensor's resistance to change, and detect this change with electronic circuit, and convert and output a standard measurement signal corresponding to the pressure.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A trolley case, comprising:
a case body; and
a weight monitoring device mounted on said case body for monitoring a weight of said trolley case,
wherein said weight monitoring device comprises: a pressure sensor mounted on said case body for supporting said trolley case when using, which reacts to an intension of a pressure when being applied by the pressure and outputs a corresponding electrical signal, a transmission unit electrically connected to said pressure sensor, which transmits said electrical signal to a corresponding weight value after receiving said electrical signal, and a display module electrically connected to said transmission unit for display said weight value,
wherein said weight monitoring device further comprises a switching structure, said pressure sensor is connected with said bottom of said case body via said switching structure, in such a manner that said pressure sensor does not support said trolley case when idle, and by enabling said switching structure, said pressure sensor protrudes outsides said case body to support temporarily for monitoring said weight of said trolley case real-time when using,
wherein said switching structure comprises a hinge, and a leg rotatably connected to said case body via said hinge, wherein said leg has a receiving hole vertical to said supporting surface which is leaning with respect to a ground and fully attaching to the ground when supporting said trolley case, so that said receiving hole is vertical to the ground when weighing, said pressure sensor is received inside said receiving hole, and protrudes slightly outside said supporting surface, so as to weigh said trolley case when said supporting surface supports said trolley case,
wherein said switch structure further comprises a spring mounted inside said receiving hole for supporting said pressure sensor, so as to prevent said pressure sensor wholly hidden inside said receiving hole.

2. A trolley case, comprising:
a case body; and
a weight monitoring device mounted on said case body for monitoring a weight of said trolley case,
wherein said weight monitoring device comprises: a pressure sensor mounted on said case body for supporting said trolley case when using, which reacts to an intension of a pressure when being applied by the pressure and outputs a corresponding electrical signal, a transmission unit electrically connected to said pressure sensor, which transmits said electrical signal to a corresponding weight value after receiving said electrical signal, and a display module electrically connected to said transmission unit for display said weight value,
wherein said weight monitoring device further comprises a switching structure, said pressure sensor is connected with said bottom of said case body via said switching structure, in such a manner that said pressure sensor does not support said trolley case when idle, and by enabling said switching structure, said pressure sensor protrudes outsides said case body to support temporarily for monitoring said weight of said trolley case real-time when using,
wherein said switching structure comprises a mounting groove on said bottom of said case body, and a leg having a corresponding block on a top thereof for engaging with said mounting groove, wherein said leg has a receiving hole vertical to said supporting surface which is leaning with respect to a ground and fully attaching to the ground when supporting said trolley case, so that said receiving hole is vertical to the ground when weighing, said pressure sensor is received inside said receiving hole, and protrudes slightly outside said supporting surface, so as to weigh said trolley case when said supporting surface supports said trolley case,
wherein said switch structure further comprises a spring mounted inside said receiving hole for supporting said pressure sensor, so as to prevent said pressure sensor wholly hidden inside said receiving hole.

3. The trolley case, as recited in claim 1, wherein said pressure sensor protrudes on a rear side of said case body, and has a supporting surface for supporting said trolley case, said display module is mounted on a front side of said case body.

4. The trolley case, as recited in claim 2, wherein said pressure sensor protrudes on a rear side of said case body, and has a supporting surface for supporting said trolley case, said display module is mounted on a front side of said case body.

5. The trolley case, as recited in claim 3, wherein said pressure sensor is embodied as single-point supporting, which is a rod structure having a first end mounted on said case body, and a second end protruding from said case body, when using, said second end supports said pressure sensor, and said pressure sensor reacts to a shape change thereof and outputs a corresponding electrical signal.

6. The trolley case, as recited in claim 4, wherein said pressure sensor is embodied as single-point supporting, which is a rod structure having a first end mounted on said case body, and a second end protruding from said case body, when using, said second end supports said pressure sensor, and said pressure sensor reacts to a shape change thereof and outputs a corresponding electrical signal.

7. The trolley case, as recited in claim 3, wherein said pressure sensor is multiple-point supporting, which has four pressure points provided on said case body and defining a supporting surface, so as to realize self-balance of said trolley case.

8. The trolley case, as recited in claim 4, wherein said pressure sensor is multiple-point supporting, which has four pressure points provided on said case body and defining a supporting surface, so as to realize self-balance of said trolley case.

9. The trolley case, as recited in claim 1, wherein said weight monitoring device further comprises an automatic power-off module for cutting a power supply of said weight monitoring device after said pressure sensor is idle for a substantially long time.

10. The trolley case, as recited in claim 2, wherein said weight monitoring device further comprises an automatic power-off module for cutting a power supply of said weight monitoring device after said pressure sensor is idle for a substantially long time.

11. The trolley case, as recited in claim 3, wherein said weight monitoring device further comprises an automatic power-off module for cutting a power supply of said weight monitoring device after said pressure sensor is idle for a substantially long time.

12. The trolley case, as recited in claim 1, wherein said weight monitoring device further comprises a switch, said pressure sensor is mounted on a bottom of said case body to support.

13. The trolley case, as recited in claim 2, wherein said weight monitoring device further comprises a switch, said pressure sensor is mounted on a bottom of said case body to support.

14. The trolley case, as recited in claim 3, wherein said weight monitoring device further comprises a switch, said pressure sensor is mounted on a bottom of said case body to support.

15. The trolley case, as recited in claim 1, wherein said leg is detachable from said case body.

16. The trolley case, as recited in claim 2, wherein said leg is detachable from said case body.

17. The trolley case, as recited in claim 3, wherein said leg is detachable from said case body.

18. The trolley case, as recited in claim 1, wherein said pressure sensor is embodied as a resistance strain gauge pressure sensor, a semiconductor gauge pressure sensor, a piezoresistive pressure transducer, an inductive pressure sensor, a capacitive pressure sensor, a resonant pressure sensor or a capacitive accelerometer.

19. The trolley case, as recited in claim 2, wherein said pressure sensor is embodied as a resistance strain gauge pressure sensor, a semiconductor gauge pressure sensor, a piezoresistive pressure transducer, an inductive pressure sensor, a capacitive pressure sensor, a resonant pressure sensor or a capacitive accelerometer.

20. The trolley case, as recited in claim 3, wherein said pressure sensor is embodied as a resistance strain gauge pressure sensor, a semiconductor gauge pressure sensor, a piezoresistive pressure transducer, an inductive pressure sensor, a capacitive pressure sensor, a resonant pressure sensor or a capacitive accelerometer.

* * * * *